US008595579B2

(12) United States Patent
Yang et al.

(10) Patent No.: US 8,595,579 B2
(45) Date of Patent: Nov. 26, 2013

(54) METHOD FOR DL SEMI-PERSISTENT SCHEDULING HARQ PROCESS ALLOCATION AND APPARATUS THEREOF

(75) Inventors: Tao Yang, Shanghai (CN); Antonella Faniuolo, Oxfordshire (GB)

(73) Assignee: Alcatel Lucent, Paris (FR)

( * ) Notice: Subject to any disclaimer, the term of this patent is extended or adjusted under 35 U.S.C. 154(b) by 312 days.

(21) Appl. No.: 12/997,757

(22) PCT Filed: Jun. 16, 2008

(86) PCT No.: PCT/CN2008/001166
§ 371 (c)(1),
(2), (4) Date: Dec. 13, 2010

(87) PCT Pub. No.: WO2009/152637
PCT Pub. Date: Dec. 23, 2009

(65) Prior Publication Data
US 2011/0093756 A1    Apr. 21, 2011

(51) Int. Cl.
*H04L 1/18*     (2006.01)
*G08C 25/02*    (2006.01)

(52) U.S. Cl.
USPC ........... 714/748; 714/750; 370/252; 370/329; 375/211

(58) Field of Classification Search
USPC ............ 714/748–751; 370/252, 329; 375/211
See application file for complete search history.

(56) References Cited

U.S. PATENT DOCUMENTS

2006/0092973 A1* 5/2006 Petrovic et al. .............. 370/469

FOREIGN PATENT DOCUMENTS

| CN | 1689261 A | 10/2005 |
|---|---|---|
| CN | 101106439 A | 1/2008 |
| CN | 101197644 A | 6/2008 |
| WO | WO2008024340 A2 | 2/2008 |

OTHER PUBLICATIONS

Huawei "HARQ process Id of DL persistent scheduling,"3GPP DRAFT; R2-082215, 3rd Generation Partnership Project (3GPP),Apr. 29, 2008.*
International Search Report for PCT/CN2008/001166 dated Mar. 3, 2009.
Huawei, "HARQ process id of DL persistent scheduling," $3^{rd}$ Generation Partnership Project (3GPP), 3GPP TSG-RAN WG2 #62, R2-082215, XP050139985, pp. 1-3, Kansas City, USA, May 5-9, 2008.
Nokia Corporation et al., "Persistent scheduling for DL," $3^{rd}$ Generation Partnership Project (3GPP), 3GPP TSG-RAN WG2 Meeting #62, R2-082302, R2-081542, XP050140051, pp. 1-6, Kansas City, USA, May 5-9, 2008.
Nortel, "HARQ Process ID's for DL Persistent scheduling," $3^{rd}$ Generation Partnership Project (3GPP), 3GPP TSG RAN WG2 #60, R2-075153, XP003023536, pp. 1-5, Jeju, South Korea, Nov. 5-9, 2007.
Supplementary European Search Report for EP 08 75 7447 dated Jul. 20, 2012.

* cited by examiner

*Primary Examiner* — Guy Lamarre
(74) *Attorney, Agent, or Firm* — Fay Sharpe LLP

(57) ABSTRACT

A method for HARQ process allocation for DL SPS transmission between a base station and an UE, and a system thereof are disclosed. The method and system according to the present application achieve HARQ process allocation for DL SPS transmission, while improving the DS transmission chance and reducing the ambiguity between different SPS transmissions and between SPS transmission and DS transmission.

25 Claims, 13 Drawing Sheets

METHOD FOR DL SEMI-PERSISTENT SCHEDULING HARQ PROCESS ALLOCATION AND APPARATUS THEREOF

FIELD OF THE INVENTION

The present invention relates to wireless mobile communications field and, more particularly, to a method and apparatus for Hybrid Automatic Repeat Request (HARQ) process allocation for downlink (DL) Semi-Persistent Scheduling (SPS) between a base station and a User Equipment (UE) in a wireless communication system.

BACKGROUND OF THE INVENTION

In Long Term Evolution (LTE), the semi-persistent scheduling (SPS) concept for uplink (UL) and downlink (DL) are adopted to decrease the control signaling transmission in the Uu interface.

For DL, only one Physical Downlink Control Channel (PDCCH) control signaling is needed to activate the SPS configuration which is configured by RRC. After that, no PDCCH is needed for each SPS initial transmission since the User Equipment (UE) knows the TF from its previous RRC configuration. On the other hand, for the SPS retransmission, due to the asynchronous DL HARQ, a DL PDCCH is needed to indicate the HARQ process ID so that the UE can perform the HARQ combining correctly. One HARQ process is associated with one HARQ buffer in which data to be re-transmitted is stored for HARQ combining during re-transmission. Typically one HARQ buffer can only store one data block, i.e., the data being transmitted in the course of the HARQ process. In some circumstance, such as a Multiple Input Multiple Output (MIMO) case, a HARQ buffer may store two data blocks. In such a case, the receiver receives two data blocks at the same time within one HARQ process. The two data blocks are stored into respective HARQ buffers so that HARQ combining can be performed.

Since no PDCCH is needed for SPS initial transmission, the UE does not know which HARQ process the current SPS transmission is mapped to and thus ambiguity occurs. For example, the SPS data 1 is transmitted by HARQ process ID1 and HARQ retransmission is needed. Before the SPS data 1's retransmission, another SPS data 2's initial transmission happens in HARQ process ID2 which also needs HARQ retransmission. Then in the following Transmission Time Interval (TTI), the base station sends down a DL PDCCH for retransmission indicating HARQ process ID1. However, at the UE side, the UE does not know whether the HARQ process ID1 is used to carry SPS data 1 or SPS data 2, and thus it is impossible for it to perform the HARQ combining correctly.

There are two solutions proposed against this problem:

1. The first one is to reserve several dedicated HARQ processes for SPS transmission. For example, assuming 3 HARQ processes are reserved for SPS configured by RRC. For the first SPS transmission, HARQ process ID1 is used, and HARQ process ID2 is used for the next SPS transmission and HARQ process ID3 is used for the third SPS transmission, and then HARQ process ID1 for the fourth and so on. The concept is shown in FIG. 1, where 2 HARQ process IDs are reserved as an example. In the first SPS transmission occasion, the HARQ process ID1 is used and the HARQ process ID2 is used for the second one. So the UE can differentiate each retransmission from the HARQ process ID in the DL PDCCH and perform correct HARQ combining. Form this point of view, no ambiguity happens. However, there is no HARQ process ambiguity only for the consecutive SPS data transmission. However, reserving more than one dedicated HARQ process for SPS will decrease throughput for the Dynamic Scheduling (DS) since these HARQ processes can not be used for DS even when no SPS HARQ retransmission is needed, which is shown in FIG. 2. As shown in FIG. 2, the worst case may occur where almost 20% transmission chances are wasted due to the dedicated HARQ process reservation for SPS. This is even worse for VoIP service. During the silence period of the VoIP service, the time interval between two SPS data blocks is about 160 ms. The throughput for DS will be largely affected if the HARQ processes reserved for 160 ms can not be released for DS transmission.

2. The second one is to reserve only one dedicated HARQ process for SPS transmission. The two consecutive SPS data blocks are stored at the same HARQ buffer at the UE side. For the HARQ retransmission, the UE can know which data block is being retransmitted from the NEW DATA INDICATION (NDI) in the DL PDCCH which is shown in FIG. 3. For example, SPS data 1 and SPS data 2 are sent down consecutively and both need HARQ retransmissions. The UE keeps these two TBs in the same HARQ process (ID1 for example). Before SPS data 2 is sent down, the UE receives the retransmission with PDCCH indicating NDI=0. Then the UE knows that this NDI=0 indicates the SPS data 1 and NDI=1 indicates another SPS data. So there is no ambiguity from this point of view. However, the second one cannot work for some scenarios. For example, if the PDCCH for SPS data 1 retransmission with NDI=0 is missed by the UE or no SPS data 1 retransmission happens before the SPS data 2 transmission, the UE does not know NDI=0 is for SPS data 1. When the UE receives the SPS data 2 retransmission with NDI=1, the UE does not know whether this NDI=1 is for the SPS data 1 or SPS data 2. That means the ambiguity between two SPS data's retransmission cannot be resolved. This is shown in FIG. 4. The further drawback is that one dedicated HARQ process is reserved and OS cannot use it even it is free, which decreases the OS throughput as the first proposal does.

Therefore, one solution is needed which solves the SPS transmission ambiguity while improving DS throughput with respect to HARQ process for SPS transmission of UL.

SUMMARY OF THE INVENTION

An object of the present invention is directed to the issues existing in the prior art. According to the embodiments of the present invention, there is proposed a method for HARQ process allocation for DL SPS transmission between a base station and a UE and an apparatus thereof, which improves the utility of the HARQ process while reducing the ambiguity that possibly occurs during SPS transmission.

According to the first aspect of the present invention, there is proposed a method for HARQ process allocation for DL SPS transmission between a base station and a UE, comprising steps of: at the base station side, configuring a HARQ process preserved for the SPS transmission and its related control information based on RRC or other control instructions from the upper layer, and transmitting the configured HARQ process and its related control information to the UE; determining a HARQ process allocated to the current transmission, and allocating the HARQ process preserved for the SPS transmission to possible DS transmissions when the SPS transmission is in idle; and determining a type for transmission or retransmission to be carried on the current HARQ process based on a preset criteria, then performing the determined type of transmission or retransmission, and correspondingly sending a PDCCH down.

Preferably, the method further comprises a step of receiving, at the UE Side, the RRC or other control instructions from the base station; receiving respective data transmission or retransmission and possible PDCCH from the base station; and determining a type for the received data transmission or retransmission based on a preset criteria, no as to perform respective data combination.

Preferably, the method further comprises a step of sending, at the base station side, an SPS-C-RNTI-based PDCCH down, indicating a HARQ process for a first SPS transmission using the PDCCH or the RRC or other control instructions from the upper layer, and activating the first SPS transmission.

Preferably, there is no need to send a PDCCH down for each SPS transmission following the first SPS transmission.

Preferably, the base station takes the HARQ process preserved for the SPS transmission circularly for the SPS transmission.

Preferably, the step of determining a type for transmission or retransmission to be carried in the current HARQ process based on a preset criteria at the base station side comprises steps of: indicating, at the base station side, whether the data transmission carried in the HARQ process currently preserved for the SPS transmission is an SPS transmission or a DS transmission using a standard-C-RNTI-based PDCCH or an SPS-C-RNTI-based PDCCH, and determining a type for the data retransmission carried in the current HARQ process by combining data in a HARQ buffer corresponding to a HARQ process.

Preferably, the method further comprises a step of receiving, at the UE side, a PDCCH from the base station to activate an SPS transmission, and determining a HARQ process for a first SPS transmission from the PDCCH. RRC or other control instructions.

Preferably, the method further comprises a step of evaluating, at the UE side, how to use the configured HARQ process for subsequent SPS transmission based on the received RRC or the other control instructions.

According to another aspect of the present invention, there is proposed a system for allocating a HARQ process for DL SPS transmission, comprising a base station side device, wherein the base station side device comprises: pre-configuration means for configuring a HARQ process preserved for the SPS transmission and its related control information based on RRC or other control instructions from the upper layer; HARQ process determination means for determining a HARQ process allocated to the current transmission based on configuration result of the pre-configuration means, and for allocating the HARQ process preserved for the SPS transmission to possible DS transmissions when the SPS transmission is in idle; transmission type determination means for determining a type for transmission or retransmission to be carried in the current HARQ process based on a preset criteria; and data transmission means for performing the determined transmission or retransmission, and correspondingly sending a PDCCH down.

Preferably, the base station side device further comprises: SPS transmission activation means for sending an SPS-C-RNTI-based PDCCH down to indicate a HARQ process for a first SPS transmission, and for activating the first SPS transmission. Alternatively, the RRC or other control information may be used to indicate the HARQ process for the first SPS transmission.

Preferably, there is no need to send a PDCCH down for each SPS transmission following the first SPS transmission.

Preferably, the base station side device takes the HARQ process preserved for the SPS transmission circularly for the SPS transmission.

Preferably, the transmission type determination means of the base station side device comprises: base station side HARQ buffer detection means for detecting the data buffering status in a HARQ buffer corresponding to the current HARQ process; and base station side determination means for determine a type for the data transmission or retransmission carried in the current HARQ process based on the detection result of the base station side HARQ buffer detection means.

Preferably, the system further comprises a UE side device, wherein the UE side device comprises: data reception means for receiving the RRC or other control instructions from the base station and for receiving respective data transmission or retransmission and possible PDCCH from the base station side device; data type determination means for determining a type for the received data transmission or retransmission based on a preset criteria; and data combination means for performing respective data combination based on the result of the data type determination means.

Preferably, the data determination means of the UE side device comprises: PDCCH detection means for processing the PDCCH based on the standard C-RNTI or the SPS C-RNTI, for example, the PDCCH may be firstly decoded based on the standard C-RNTI, and if failed, then it is decoded based on the SPS C-RNTI; UE side HARQ buffer detection means for detecting the data buffering status in the corresponding HARQ buffer; and UE side determination means for determining a type for the received data transmission or retransmission by combining detecting results of the PDCCH detection means and the UE side HARQ buffer detection means.

According to at least one of the aspects of the present application, many advantages can be arrived at which include among others that the utility of HARQ process is improved, the ambiguity that possibly occurs during SPS transmission is reduced and the DS data loss rate is decreased.

BRIEF DESCRIPTION OF THE DRAWINGS

The above and other objects, features and advantages of the present invention will be clearer from the following detailed description about the preferred embodiments of the present invention taken in conjunction with the accompanied drawings, in which.

DETAILED DESCRIPTION OF THE PREFERRED EMBODIMENTS

The present invention will be now described, by way of illustration and not by way of limitation, according to its preferred embodiments, by particularly referring to the Figures of the enclosed drawings, in which:

As described below, the present application provides a method for HARQ process allocation for DL SPS transmission between a base station and a UE, comprising steps of: at the base station side, configuring a HARQ process preserved for the SPS transmission and its related control information based on RRC or other control instructions from the upper layer, and transmitting the configured HARQ process and its related control information to the UE; determining a HARQ process allocated to the current transmission, and allocating the HARQ process preserved for the SPS transmission to possible DS transmissions when the SPS transmission is in idle; and determining a type for transmission or retransmission to be carried in the current HARQ process based on a preset criteria, then performing the determined transmission or retransmission, and correspondingly sending a PDCCH down; at the UE side, receiving the RRC or other control instructions from the base station; receiving respective data transmission or retransmission and possible PDCCH from the base station; and determining a type for the received data transmission or retransmission based on a preset criteria, so as to perform respective data combination.

FIG. 5 and FIG. 6 show detailed flowcharts of a method for HARQ process allocation for DL SPS transmission according to an embodiment of the present application.

Figure 1:
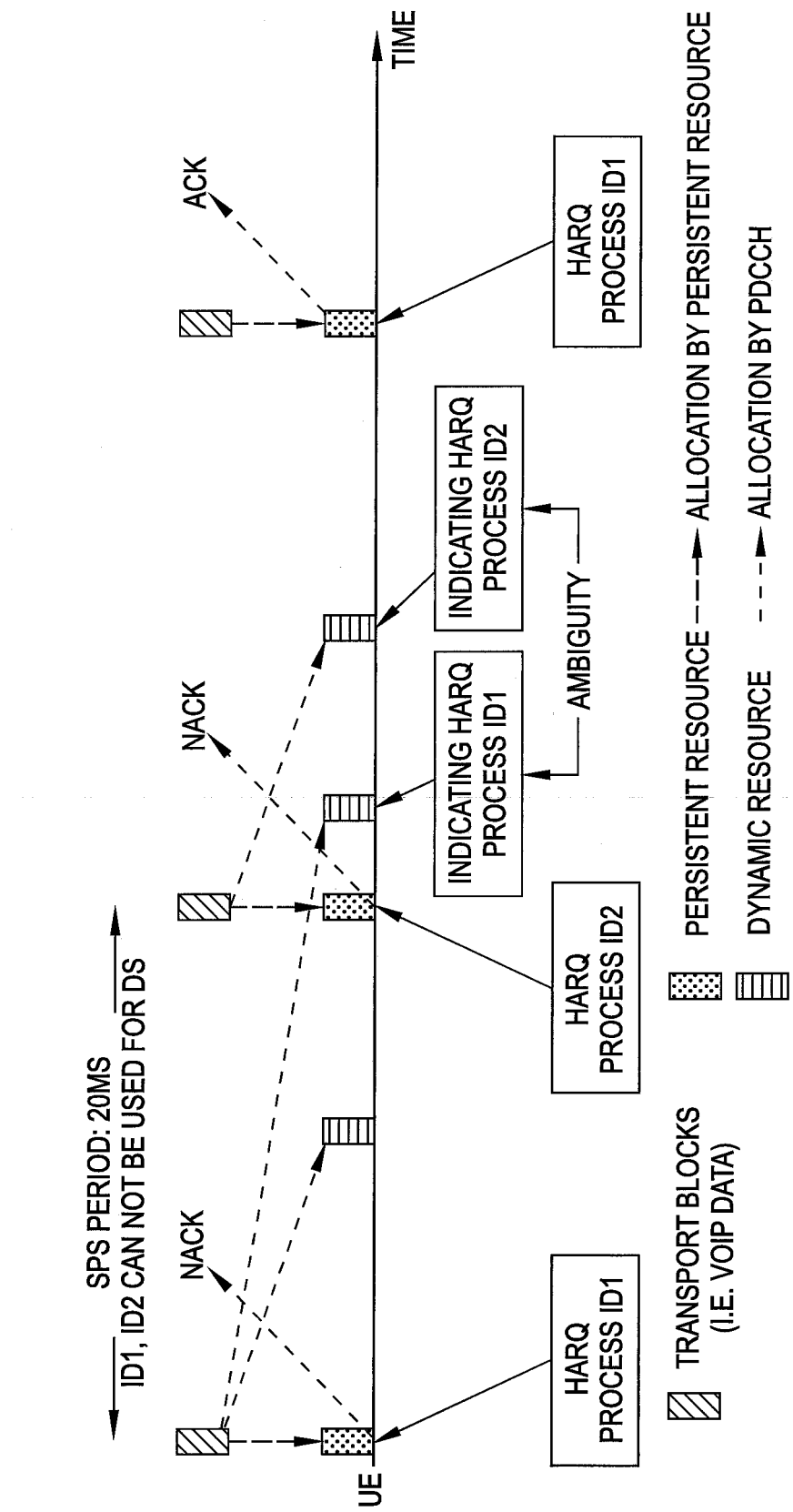
FIG. 1 is a schematic diagram for explaining one typical proposal for allocating HARQ process to DL SPS transmission.
Figure 2:
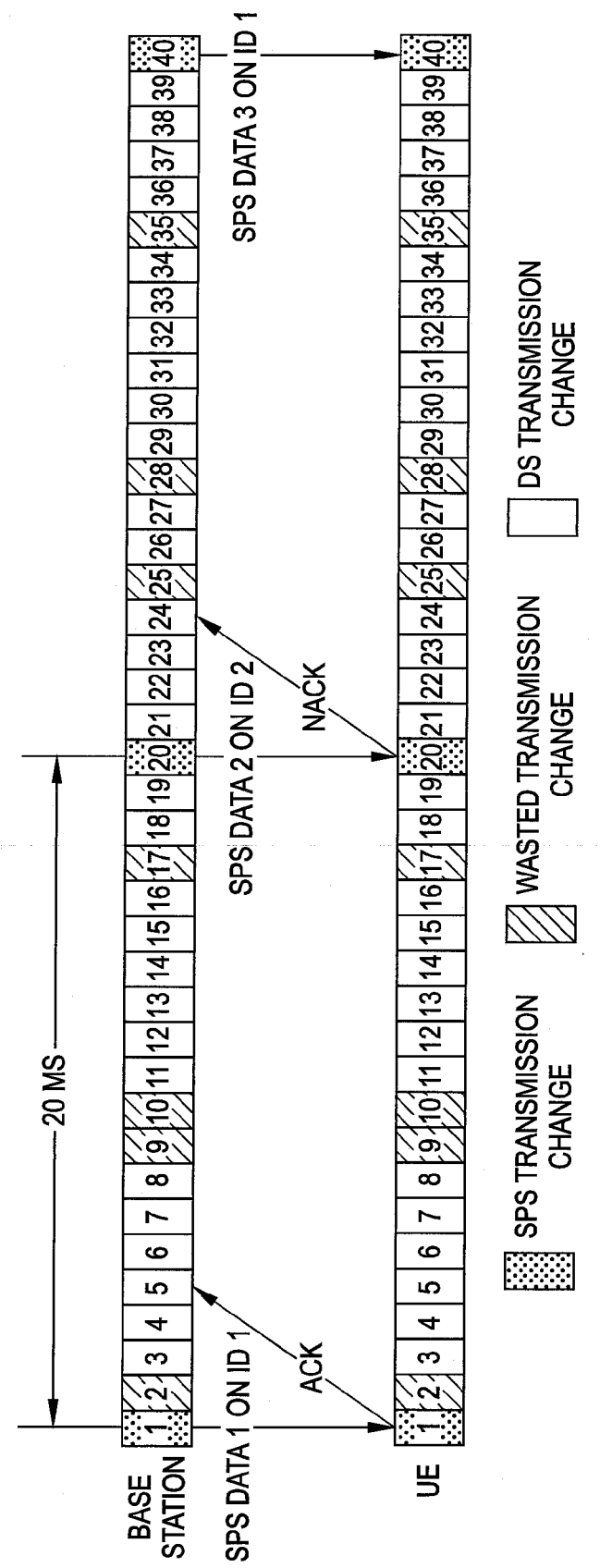
FIG. 2 illustrates the drawback of the proposal shown in FIG. 1.
Figure 3:
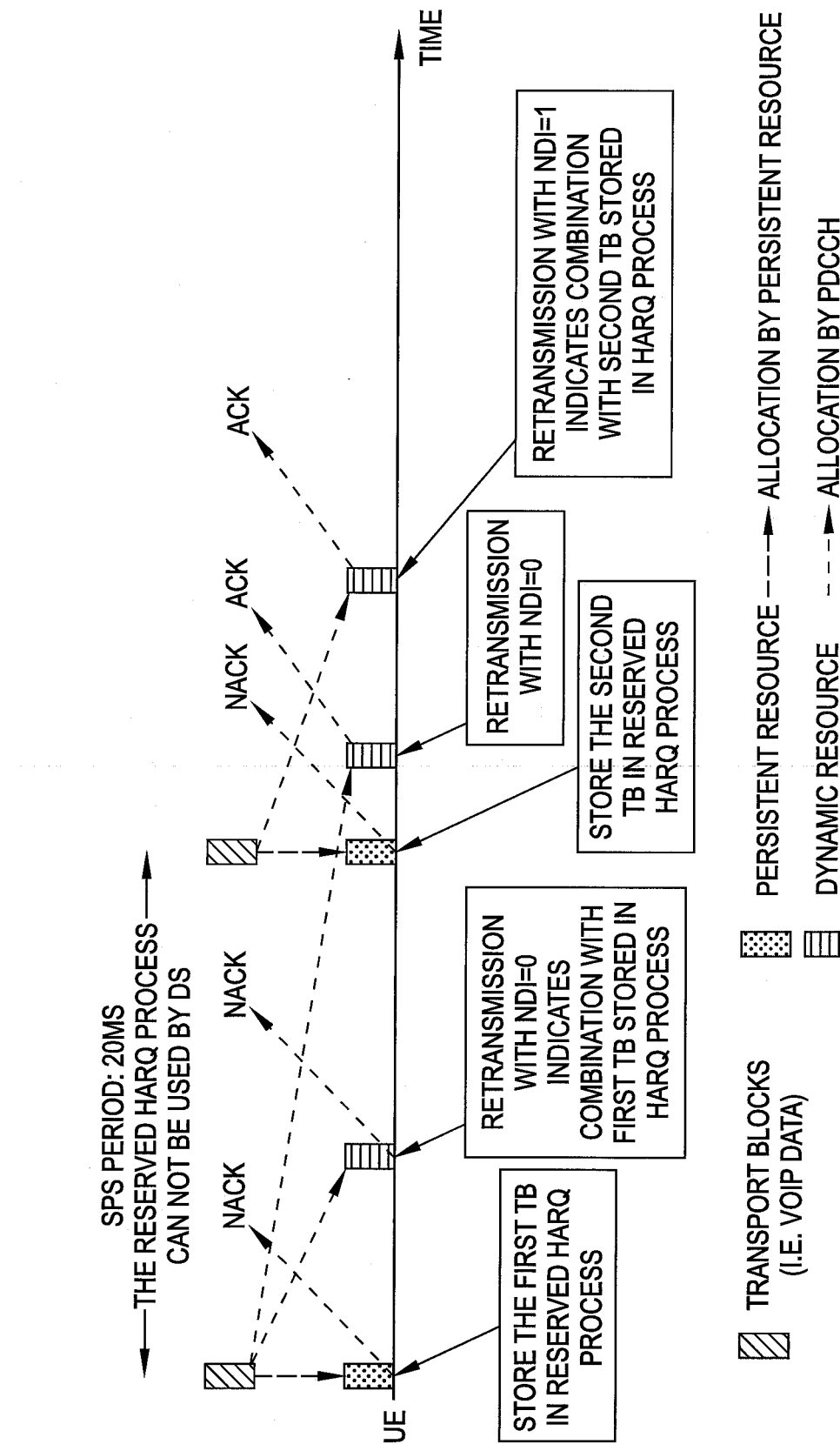
FIG. 3 is a schematic diagram for explaining another typical proposal for allocating HARQ process to DL SPS transmission.
Figure 4:
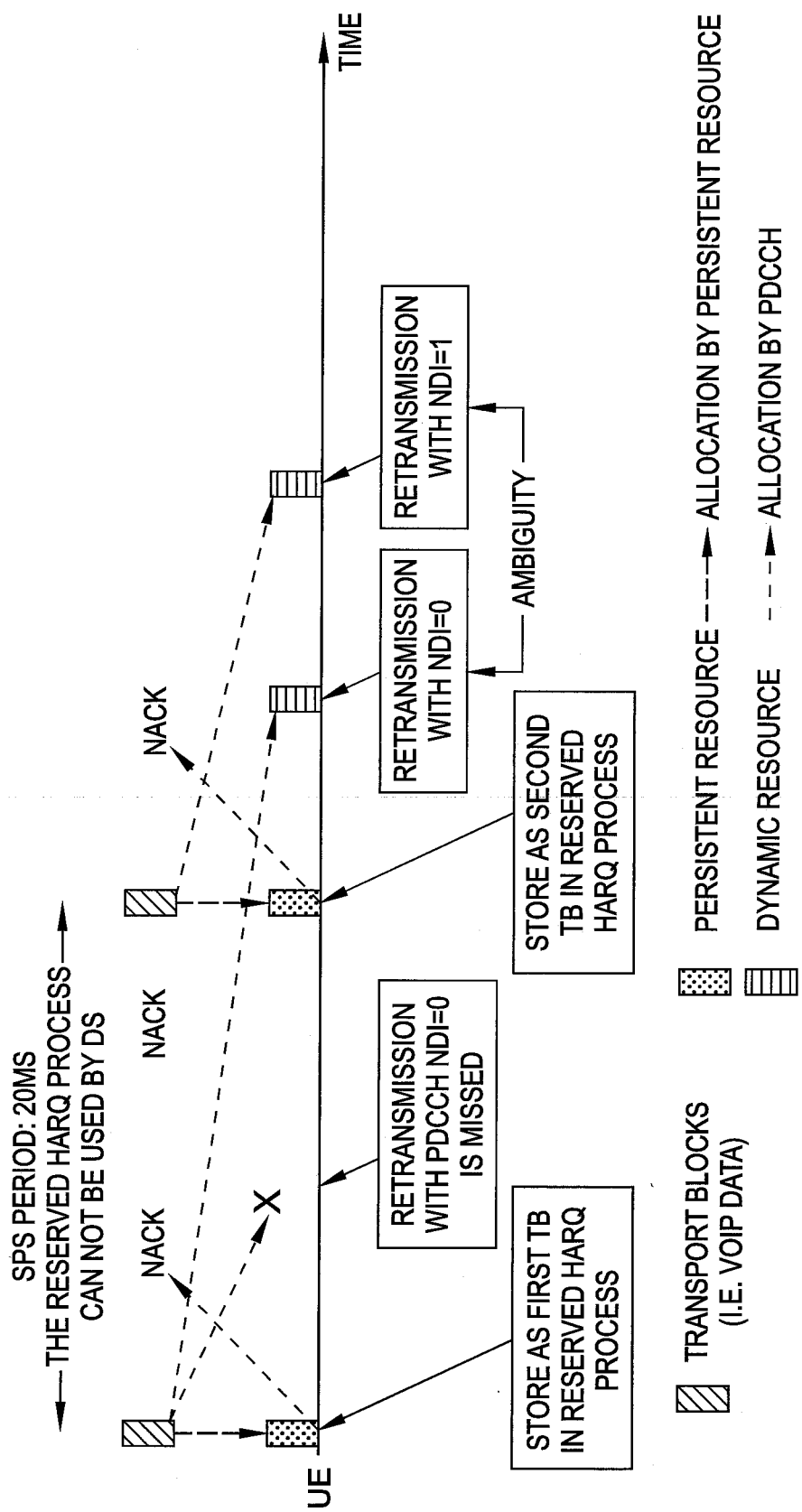
FIG. 4 illustrates the drawback of the proposal shown in FIG. 2.
Figure 5A:
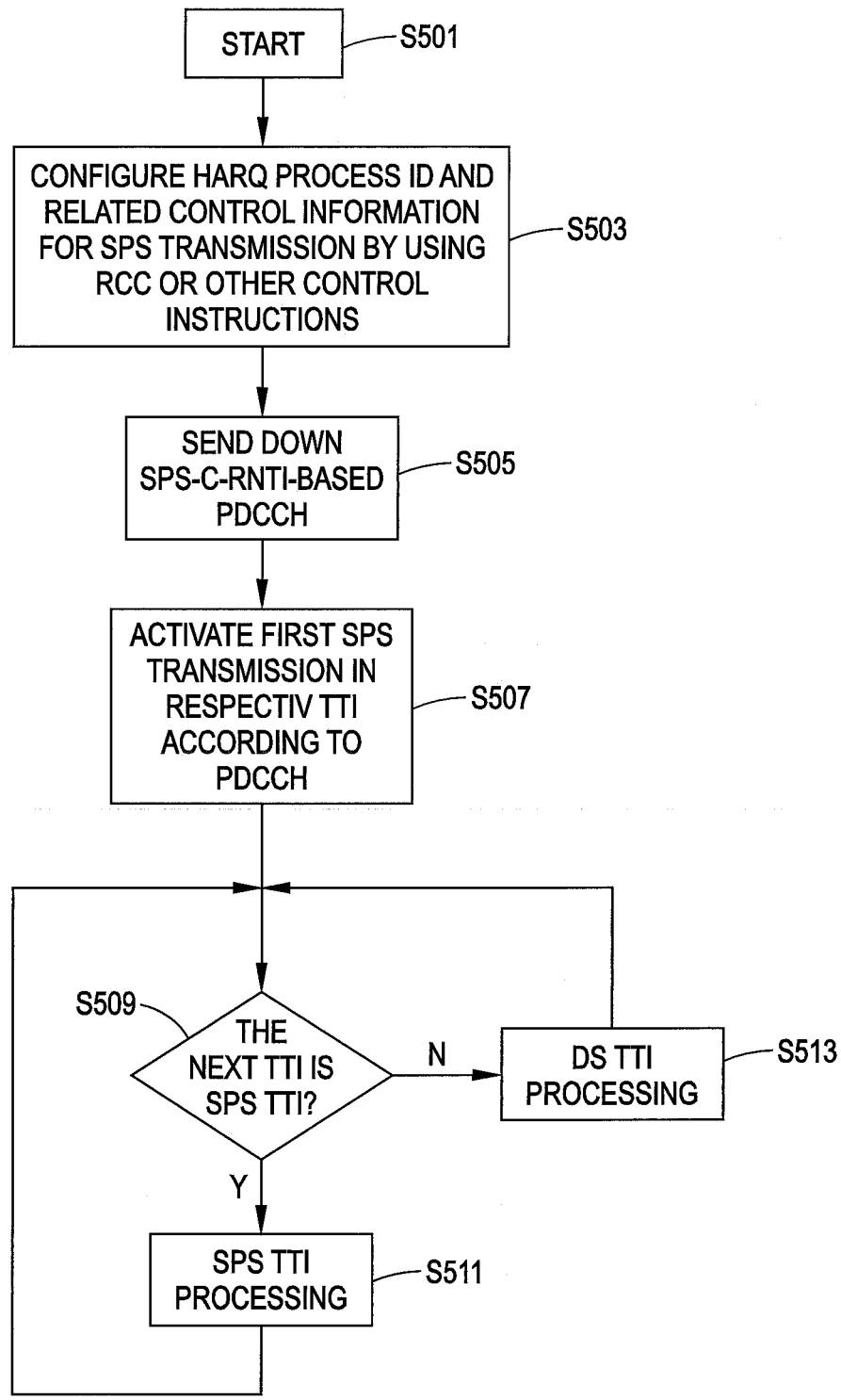
FIGS. 5a-5c and FIGS. 6a-6c show flow charts of a method for HARQ process allocation for DL SPS transmission according to an embodiment of the present application from the base station and the UE points of view respectively.
Figure 5B:
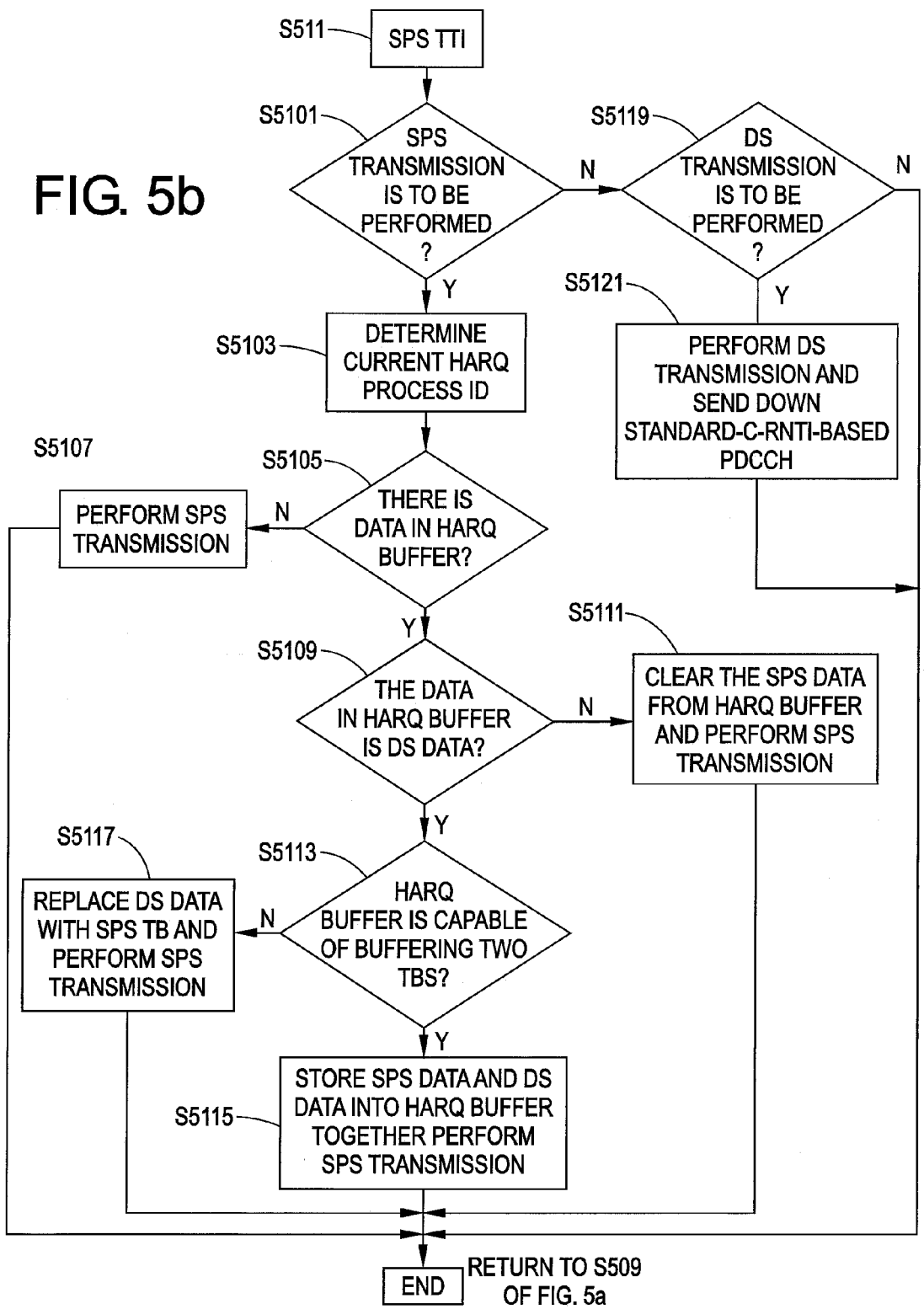
Figure 5C:
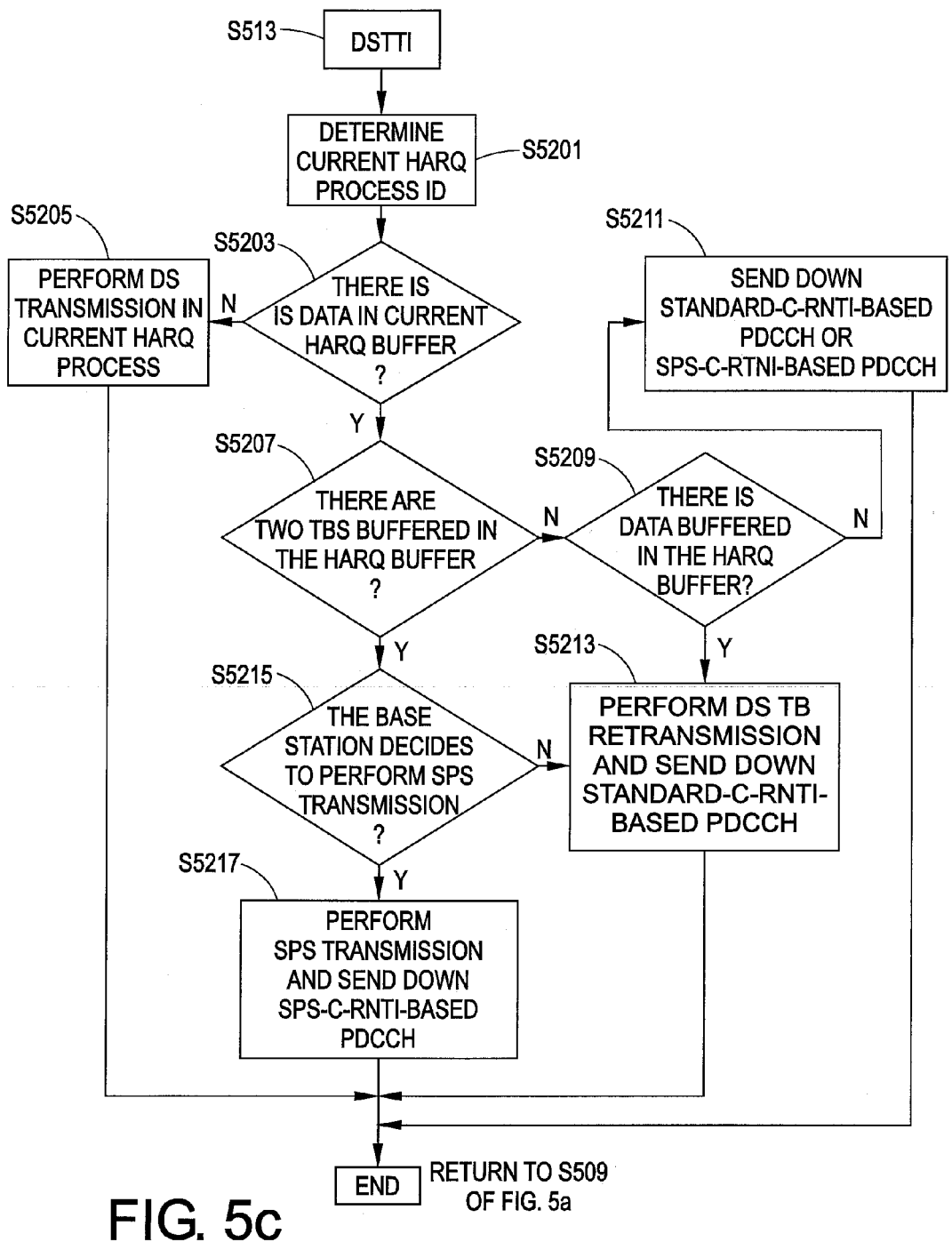

FIGS. 5a-5c show detailed flowcharts of a method for HARQ process allocation for DL SPS transmission according to an embodiment of the present application from the base station points of view.

As shown in FIG. 5a, the method starts at step S501 at the base station side. Before the SPS transmission commences. HARQ process IDs for SPS transmission and related control information are configured by using RRC or other control instructions (step S503), and the configured HARQ process IDs will be circularly used by the base station in SPS TTIs. After that, the base station sends down an SPC-C-RNTI-based PDCCH, indicating in which HARQ process the first SPS transmission occurs (step S505). Alternatively, at step S503, the base station configures a HARQ process preserved for the first SPS transmission by using RRC instructions. Following that, the first SPS transmission is activated in a respective TTI according to the PDCCH (step S507). At step S509, it is determined whether the next TTI is an SPS TTI. If yes, the method proceeds to step S511 where SPS TTI processing is performed and returns to step S509 after the respective SPS TTI processing has been finished, so as to perform processing on the next TTI. If no, the method proceeds to step S513 where DS TTI processing is performed, and returns to step S509 after the respective DS TTI processing has been finished.

FIG. 5b illustrates in detailed the process of SPS TTI processing (i.e., step S511). FIG. 5b starts as the determination of step S509 in FIG. 5a results in yes. At step S5101, the base station determines whether SPS transmission is to be performed. If yes, the method proceeds to step S5103. At step S5103, the current HARQ process ID is determined. Then, it is detected whether there is data in the respective HARQ buffer or not (step S5105). If no, i.e., there is no data in the HARQ buffer, SPS transmission is performed (S5107). After that, the current SPS TTI processing ends, and the method returns to step S509 of FIG. 5a. If yes, i.e., there is data in the HARQ buffer, it is determined whether the data is DS data (step S5109). If no, i.e., it is one SPS data that is buffered in the HARQ buffer, the SPS data for re-transmission is cleared from the HARQ buffer and an SPS transmission is performed (step S5111). After that, the current SPS TTI processing ends and the method returns to step S509 of FIG. 5a. If the determination of step S5109 results in yes, i.e., the data buffered in the HARQ buffer is DS data, it is determined whether the HARQ buffer is capable of buffering two TBs (step S5113). The buffer is capable of buffering two TBs only if the two TBs are one DS data and one SPS data. In such a case, the base station stores the SPS data and the DS data into the HARQ buffer together and performs SPS transmission (step S5115). The method then returns to step S509 of FIG. 5a. If there is one TB buffered in the HARQ buffer, the DS TB is replaced with an SPS TB and an SPS transmission is performed (Step S5117). Similarly, the method then returns to step S509 of FIG. 5a. Furthermore, when the determination of step S5101 gets no, that is, the base station decides not to perform SPS transmission in current SPS TTI, the method proceeds to step S5119, where it is determined that whether DS transmission is to be performed or not by the base station. If yes, a standard-C-RNTI-based PDCCH is sent down, and DS transmission is performed (step S5121). The method then returns to step S509 of FIG. 5a. If no, i.e., the current TTI processing ends, the method returns to step S509 of FIG. 5a similarly.

FIG. 5c illustrates in detailed the process of DS TTI processing (i.e., step S513). FIG. 5c starts as the determination of step S509 in FIG. 5a results in no. At step S5201, the current HARQ process ID is determined. After that, it is determined whether there is data in the current HARQ buffer (step S5203). If there is no data, a DS transmission is performed in the current HARQ process (step S5205), and then the method returns to step S509 of FIG. 5a. If yes, it is determined whether there are two TBs buffered in the HARQ buffer (step S5207). If no, it is determined whether there is DS data buffered in the HARQ buffer (step S5209). If no, i.e., it is SPS data that is buffered in the HARQ buffer, the standard-C-RNT-based PDCCH or the SPS-CRNTI-based PDCCH is sent down, and an SPS re-transmission is performed (step S5211). The method then returns to step S509 of FIG. 5a. If yes, i.e., it is DS data that is buffered in the HARQ buffer, a DS TB re-transmission is performed, and the standard-C-RNTI-based PDCCH is sent down (S5213). The method then returns to step S509 of FIG. 5a. If the determination of step S5207 gets yes, i.e., there are two TBS in the HARQ buffer, it is determined whether the base station decides to perform SPS transmission or not (step S5215). If the base station decides not to perform SPS transmission, the method proceeds to step S5213. If the base station decides to perform SPS transmission, an SPS transmission is performed, and the SPS-C-RNTI-based PDCCH is sent down (step S5217). The method then returns to step S509 of FIG. 5a.

Figure 6A:
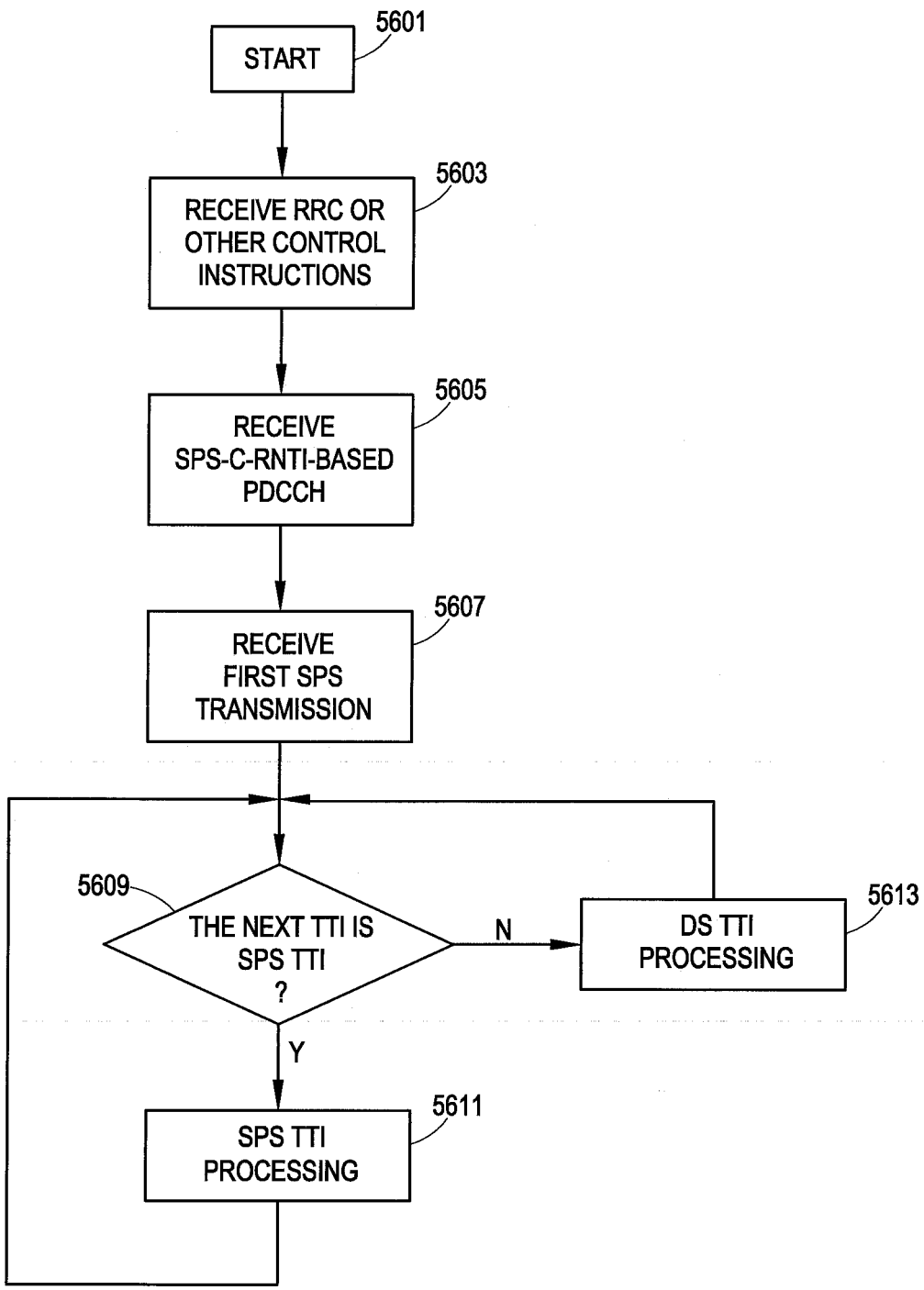
Figure 6B:
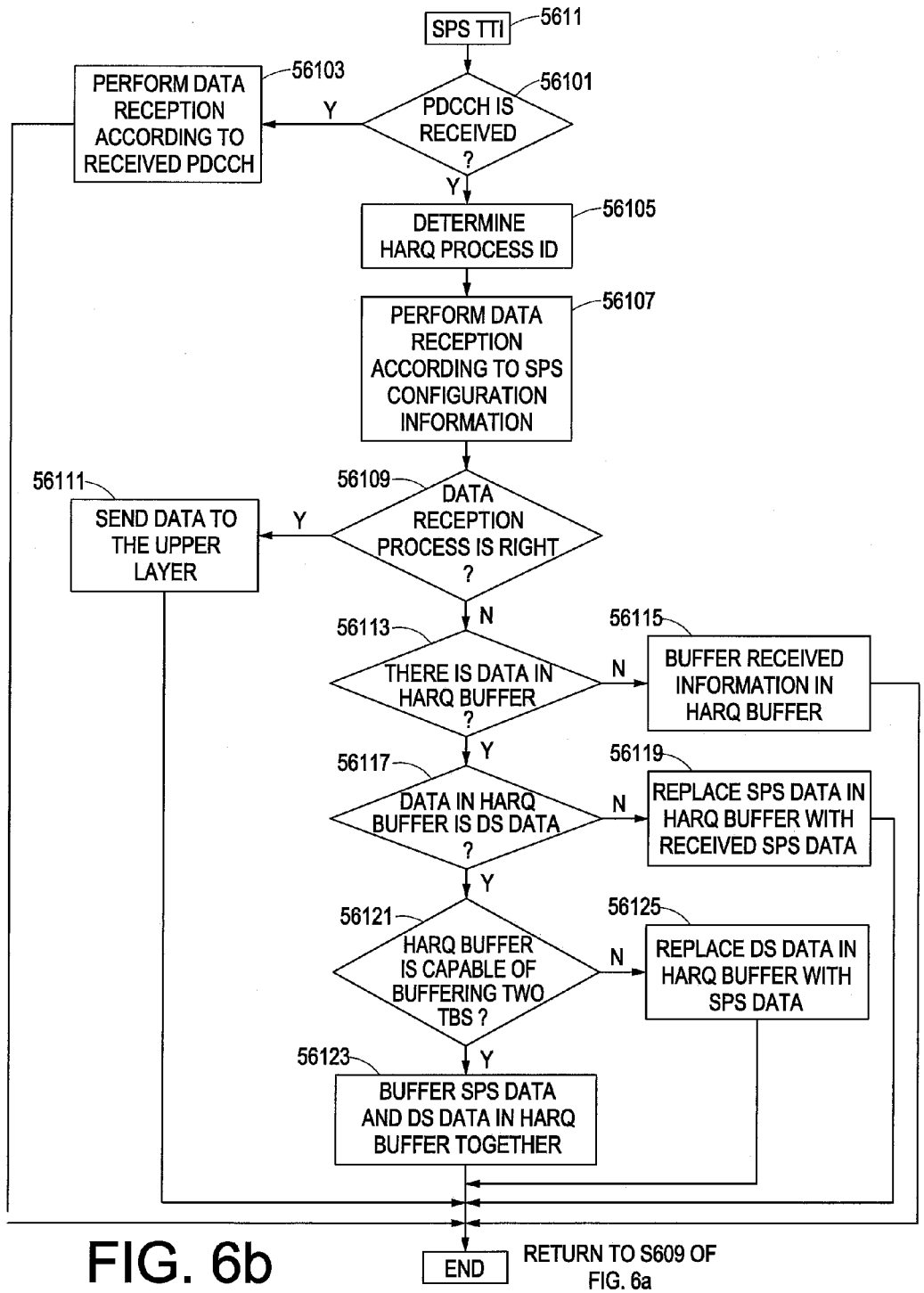
Figure 6C:
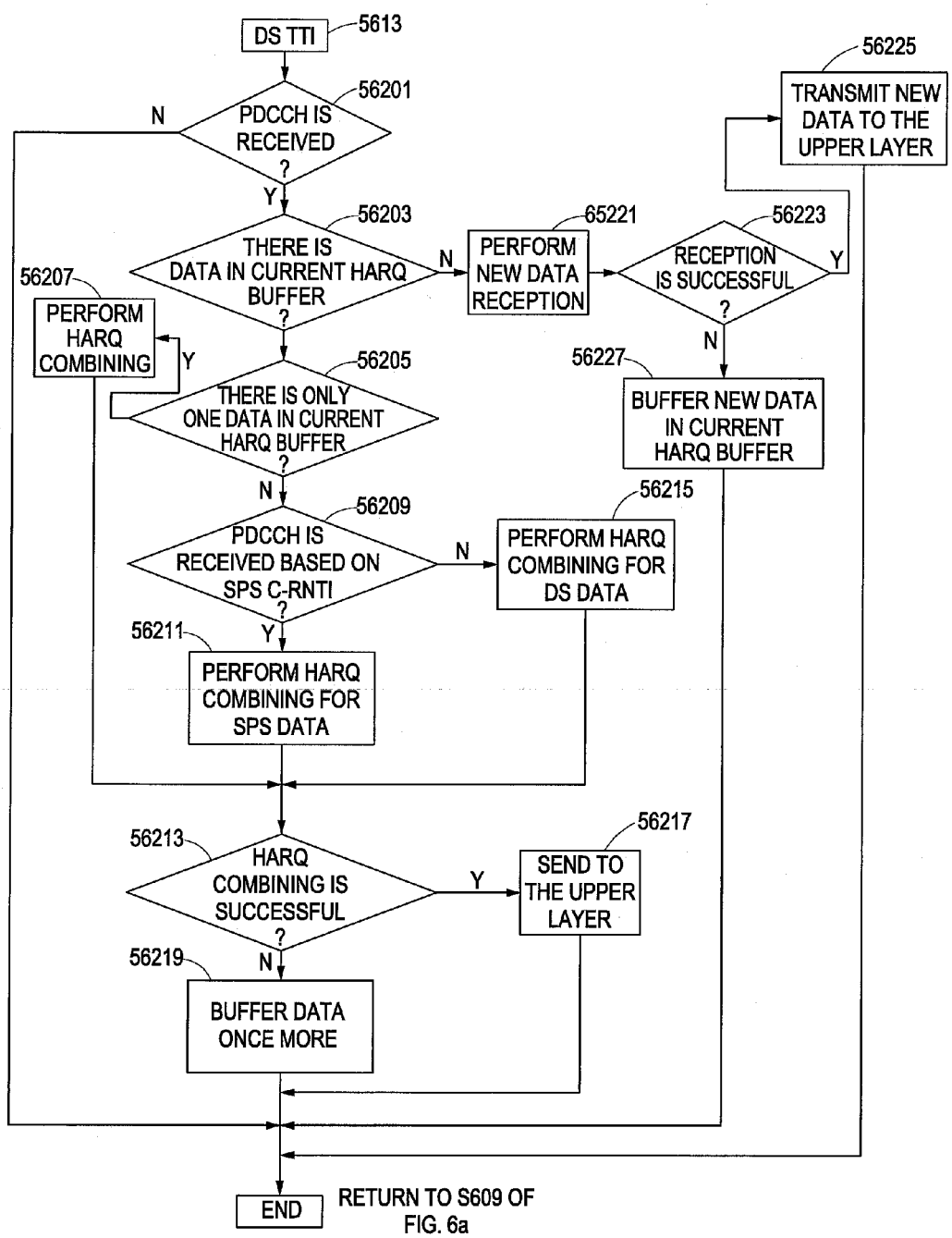

FIGS. 6a-6c show in detailed flowcharts of a method for HARQ process allocation for DL SPS transmission according to an embodiment of the present application from the UE points of view.

The method starts at step S601 at the UE side. The UE receives RRC or other control instructions from the base station (step S603), and obtains therefrom the HARQ process IDs, the transmission format and other information configured for SPS transmission. The configured HARQ process IDs are circularly used in the UE. After that, the UE receives an SPS-C-RNTI-based PDCCH (step S605), and activates SPS configurations to know in which HARQ process the first SPS occurs. Alternatively, the UE knows the HARQ process for the first SPS transmission from RRC or other control information. Here, the UE makes an evaluation on how the configured HARQ processes are circularly used in subsequent SPS TTI transmissions. At step S607, the UE receives a first SPS transmission. At step S609, it is determined whether the next TTI is an SPS TTI. If yes, the method proceeds to step S611 where SPS TTI processing is performed. The method returns to step S609 after the respective SPS TTI processing has been finished, so as to perform processing on the next TTI. If no, the method proceeds to step S613 where DS TTI processing is performed, and returns to step 609 after the respective DS TTI processing has been finished.

FIG. 6b illustrates in detailed the process of SPS TTI processing (i.e., step S611). FIG. 6b starts as the determination of step S609 in FIG. 6a results in yes. At step 6101, it is determined whether POOCH is received by the UE. If yes, data reception is performed according to the received POOCH (step S6103). If no, the HARQ process ID for current SPS TTI is determined (step S6105), and data reception is performed according to SPS configuration information (step S6107). Following that, it is determined whether the data reception process in step S6107 is right or not (step S6109). If it is right, the UE sends the data to the upper layer (step S6111). Then the current SPS TTI processing ends and the method returns to step S609 of FIG. 6a. If the data reception process is not right, it is determined whether there is data in the HARQ buffer (step S6113). If there is no data, the received information is buffered in the HARQ buffer (step S6115). If there is data in the HARQ buffer, it is determined whether the data in the HARQ buffer is DS data or not (step S6117). If no, the existing data in the HARQ buffer is replaced with the received SPS data (step S6119), and the current SPS TTI processing ends with the method returning to step S609 of FIG. 6a. If yes, it is determined whether the HARQ buffer is capable of buffering two TBs (step 6121). If the HARQ buffer is large enough to buffer two TBs, the SPS data and the DS data are buffered in the HARQ buffer together (step S6123), and the current SPS TTI processing ends with the method returning to step S609 of FIG. 6a. If the HARQ buffer can only buffer one TB, the existing DS data in the HARQ buffer is replaced with SPS data (step S6125), and the current SPS TTI processing ends with the method returning to step S609 of FIG. 6a.

FIG. 6c illustrates in detailed the process of DS TTI processing (i.e., step S613). FIG. 6c starts as the determination of step S609 in FIG. 6a results in no. At step S6201, it is determined whether POOCH is received by the UE. If no, the current DS TTI processing ends and the method returns to step S609 of FIG. 6a. If yes, it is determined whether there is data in the current HARQ buffer (step S6203). If yes, the method proceeds to step S6205 where it is determined whether there is only one data in the HARQ buffer. If yes, HARQ combining is performed (Step S6207), and then the method proceeds to step S6213. If no, it is determined whether the POOCH is received based on SPS C-RNTI (step S6209). If yes, HARQ combining for SPS data is performed (step S6211), and then the method proceeds to step S6213. If no, HARQ combining for DS data is performed (step S6215), and then the method proceeds to step S6213. At step S6213, it is determined whether the HARQ combining is successful or not. If it is successful, data is transmitted to the upper layer (step S6217). The current DS TTI processing ends and the method returns to step S609 of FIG. 6a. If it is not successful, the data is buffered once more (step S6219), then the current DS TTI processing ends and the method returns to step S609 of FIG. 6a. If the determination of step S6203 gets no, i.e., there is no data in the current HARQ buffer, the method proceeds to step S6221 where new data reception is performed. Following that, it is again determined whether the reception is successful or not (step S6223). If it is successful, the new data is transmitted to the upper layer (step S6225), then the current DS TTI processing ends and the method returns to step S609 of FIG. 6a. If it is not successful, the new data is buffered in the current HARQ buffer (step S6227), then the current DS TTI processing ends and the method returns to step S609 of FIG. 6a.

The above description presents the particularly implementation of the method for HARQ process allocation for DL SPS transmission according to the embodiments of the present application.

Figure 7:
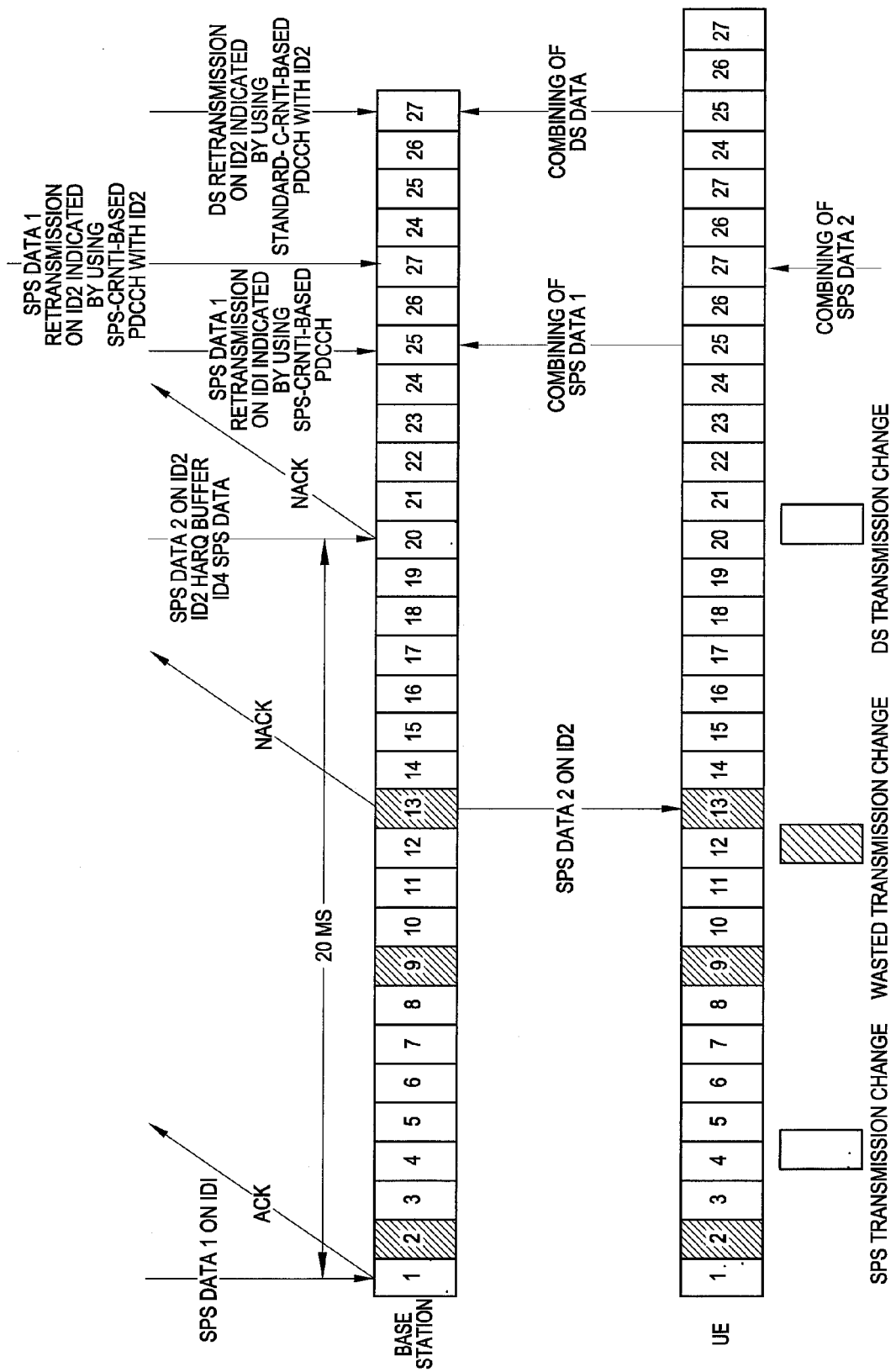
FIG. 7 illustrates an example for HARQ process allocation for DL SPS transmission according to an embodiment of the present application.

FIG. 7 illustrates an example of the method according to an embodiment of the present application.

As shown in FIG. 7, assuming HARQ process ID1 (ID1) indicated in the first PDCCH to activate the SPS configuration and assuming ID1 and ID2 will be used for SPS circularly.

SPS data 1 is transmitted and re-transmitted via ID1 in TTI1~TTI20 but fails.

DS data is transmitted via ID2 but also fails.

In TTI20, DS data and SPS data 2 are buffered in the HARQ buffer with ID2 together, and then SPS data 2 is transmitted but fails.

In TTI25, the base station performs re-transmission of SPS data 1 with PDCCH indicating HARQ process ID1 based on standard C-RNTI,
    the UE then combines correctly the re-transmitted SPS data 1 with that stored in HARQ process ID1 buffer.

In TTI27, the base station performs re-transmission of SPS data 2 with PDCCH indicating ID2 based on SPS-CRNTI,
    the UE then combines correctly the re-transmitted SPS data 2 with that stored in HARQ process ID2 buffer.

In TTI30, the base station performs re-transmission of DS with PDCCH indicating ID2 based on standard C-RNTI,
    then the UE combines correctly the re-transmitted DS data with that stored in ID2 buffer.

From the above, it can be seen that the method according to the embodiment of the present application has the following advantages.

The HARQ process can be used for both SPS and DS transmissions, and thus there is no need to reserve one or more HARQ processes for SPS transmission. PDCCH or RRC instruction is used to indicate the HARQ process for the first SPS transmission, which guarantees the synchronization between the base station and the UE for the first and subsequent SPS transmissions. Accordingly, there is no need to map the reserved dedicated HART process with SFN as other companies proposed. Instead, the UE only needs to detect the PDCCH for DL assignment based on the normal C-RNTI. Moreover, the possibility of loss of DS data is reduced since the HARQ buffer can buffer DS TB and SPS TB at the same time.

Furthermore, the method for HARQ process allocation for DL SPS transmission according to the embodiment of the present application may be implemented without taking the size of the HARQ buffer corresponding to the HARQ process into account. The implementation in such a case (not shown) generally is the same as the above embodiment with exception that there is no need to taken the size of the HARQ buffer into account. That is, the step of determining whether the HARQ buffer is capable of storing two TBs can be omitted, and the case where only one TB is buffered is taken as default.

SPS transmission is always prioritized as needed, unless the base station forcibly makes the SPS transmission not carried.

Figure 8:
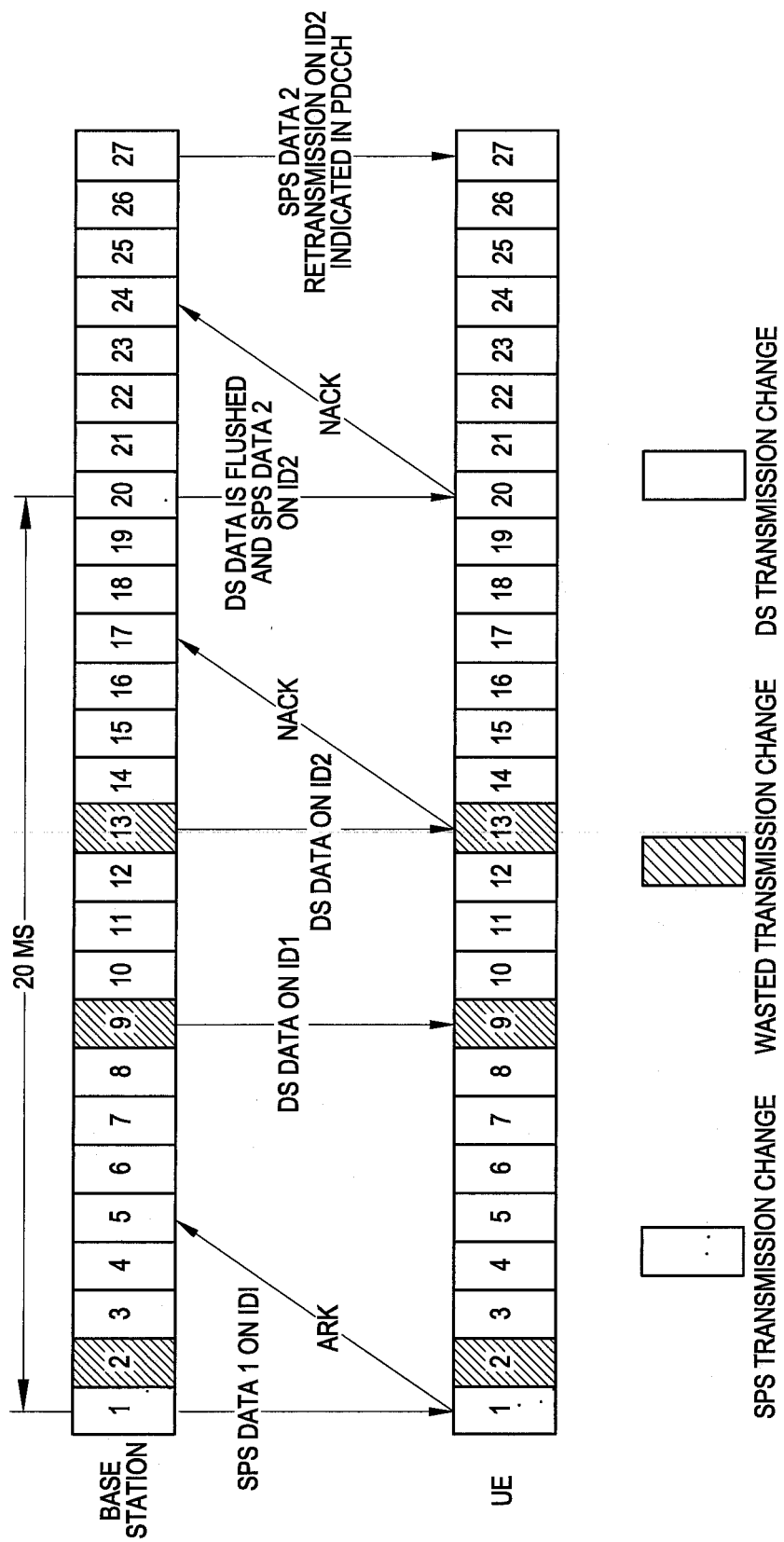
FIG. 8 illustrates another example for HARQ process allocation for DL SPS transmission according to an embodiment of the present application.

FIG. 8 illustrates an example for such a case.

As shown in FIG. 8, assuming HARQ process ID1 (ID1) is indicated in the first PDCCH to activate the SPS configuration and assuming ID1 and ID2 will be used for SPS circularly.

In TTI1, SPS data 1 is sent in DL by the base station in HARQ process ID1 and the UE feeds back ACK for the HARQ process ID1.

In TTI2~TTI18, DS data is sent in HARQ processes ID2~ID8.

In TTI9~19, HARQ processes ID1~ID8 can be used for DS data transmission.

Assuming the UE feeds back NACK for DS data in HARQ process ID2 in TTI13.

In TTI20 which is the second SPS TTI, HARQ process ID2 should be used for SPS according to a pre-defined rule as follows:

The base station replaces DS data with SPS data in the HARQ buffer corresponding to HARQ process ID2 and sends down the SPS data 2 to the UE;

At the UE side, the DS data in the HARQ buffer corresponding to HARQ process ID2 is replaced with the SPS data 2 and NACK is fed back;

No PDCCH is needed.

Assuming the base station performs re-transmission of SPS data 2 and sends down PDCCH indicating ID2 over normal C-RNTI in TTI27.

At the UE side, the correct combing is performed between the newly received SPS Data 2 and the SPS Data 2 already stored in ID2 HARQ buffer.

No ambiguity happens during the whole procedure.

It can be seen that this solution is more easily to implement than the first embodiment, and can also bring out the advantages of improving DS transmission chance and reducing ambiguity between different SPS transmissions and between SPS and DS transmissions. On the contrary, since the HARQ buffer is not taken into account, the possibility of loss of DS data is higher than the first embodiment.

In the above embodiments, the HARQ processes reserved for SPS transmission can be two, one or more, which depends on the applications. Additionally, the base station may re-configure the HARQ process for SPS transmission as required.

Figure 9:
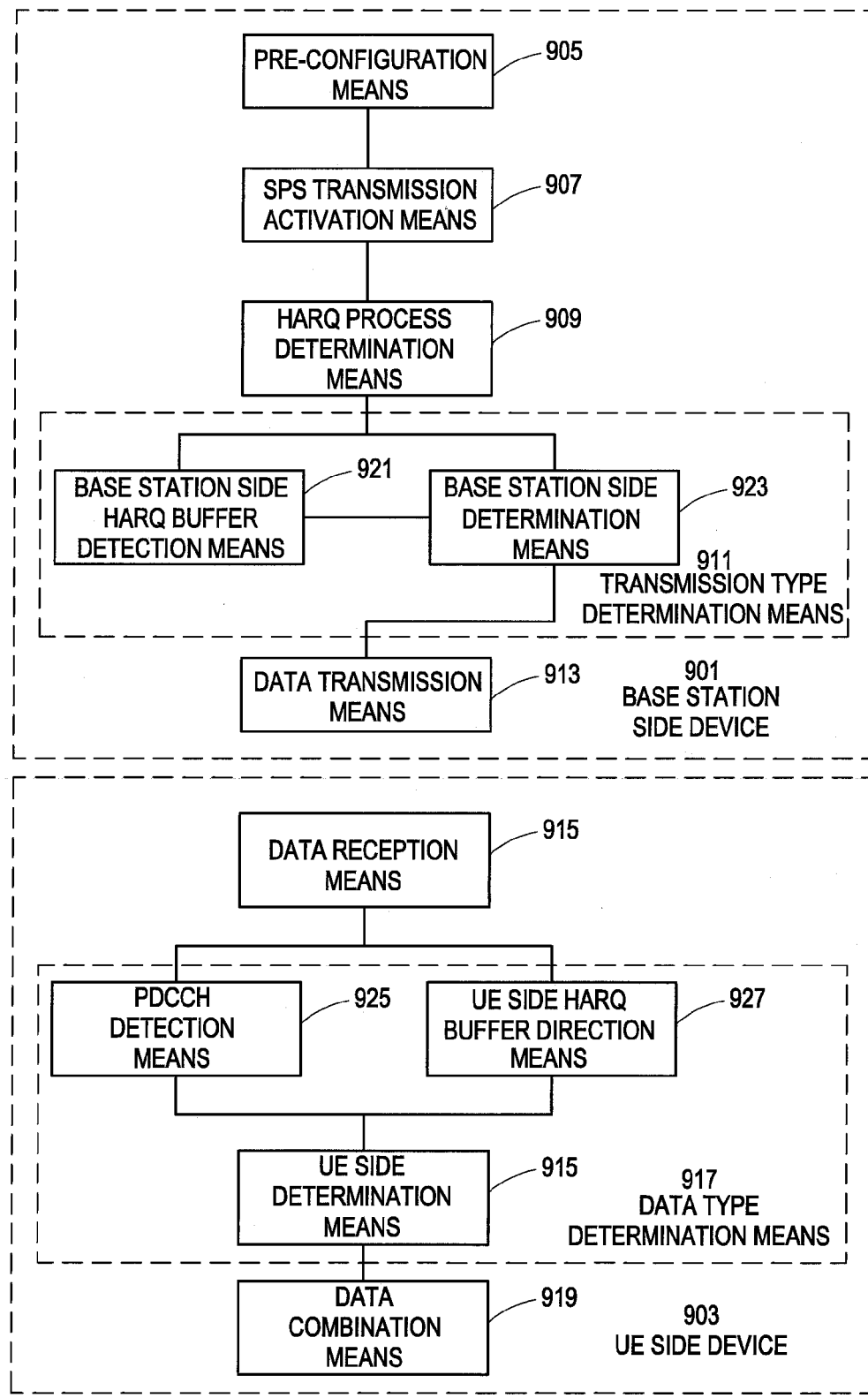
FIG. 9 is a block diagram of a system for allocating a HARQ process for DL SPS transmission according to an embodiment of the present application.

FIG. 9 is a block diagram of a system for allocating a HARQ process for DL SPS transmission according to an embodiment of the present application.

The system 900 for HARQ process allocation according to the embodiment of the present application includes a base station side device 901 and a UE side device 903.

The base station side device 901 includes pre-configuration means 905 for configuring a HARQ process preserved for the SPS transmission and its related control information based on RRC or other control instructions from the upper layer; SPS transmission activation means 907 for sending an SPS-C-RNTI-based PDCCH down to indicate an HARQ process in which a first SPS transmission occurs and activating the first SPS transmission, alternatively, the RRC instructions are used at the pre-configuration means 905 to indicate the process for the first SPS transmission; HARQ process determination means 909 for determining a HARQ process allocated to the current transmission based on configuration result of the pre-configuration means 905, and for allocating the HARQ process preserved for the SPS transmission to possible DS transmissions when the SPS transmission is in idle; transmission type determination means 911 for determining a type for transmission or retransmission to be carried in the current HARQ process based on a preset criteria; and data transmission means 913 for performing the determined type of transmission or retransmission, and correspondingly sending a PDCCH down. The transmission type determination means 909 comprises: base station side HARQ buffer detection means 921 for detecting the data buffering status in a HARQ buffer corresponding to the current HARQ process; and base station side determination means 923 for determining a type for the data transmission or retransmission to be carried in the current HARQ process based on the detection result of the base station side HARQ buffer detection means.

The UE side device 903 comprises: data reception means 915 for receiving the RRC or other control instructions from the base station side device and for receiving respective data transmission or retransmission and possible PDCCH from the base station side device; data type determination means 917 for determining a type for the received data transmission or retransmission based on a preset criteria; and data combination means 919 for performing respective data combination based on the result of the data type determination means. The data type determination means 917 comprises: PDCCH detection means 925 for processing the PDCCH based on standard C-RNTI or SPS C-RNTI, for example, the PDCCH is firstly decoded based on standard C-RNTI; if failed, it is decoded based on SPS C-RNTI; UE side HARQ buffer detection means 927 for detecting the data (and data type) buffering status in the corresponding HARQ buffer; and UE side determination means for determining a type for the received data transmission or retransmission in conjunction with detecting results of the PDCCH detection means and the UE side HARQ buffer detection means.

Although the illustrative embodiments have been described herein with reference to the accompanying drawings, it is to be understood that various modifications, substitutions and changes may be effected therein by one of ordinary skill in the pertinent art without departing from the scope or spirit of the present invention. Particularly, the various elements in the embodiments can be embodied in software, hardware or combination thereof. Therefore, the present invention should not be limited to the preferred embodiments, whose protection should only be defined by the claims.

What is claimed is:

1. A method for Hybrid Automatic Repeat Request (HARQ) process allocation for Downlink (DL) Semi-Persistant (SPS) transmission between a base station and a User Equipment (UE), comprising:

at the base station side, configuring a HARQ process preserved for an SPS transmission and related control information for the SPS transmission based on Radio Resource Control (RRC) or control instructions from an upper layer, and transmitting the configured HARQ process and its related control information to the UE;

determining a HARQ process allocated to the current transmission, and allocating the HARQ process preserved for the SPS transmission to possible Dynamic Scheduling (DS) transmissions when the SPS transmission is in idle; and determining whether an SPS of DS transmission or retransmission is to be carried in the current HARQ process based on a preset criteria, then performing the determined type of transmission or retransmission, and correspondingly sending a Physical Downlink Control Channel (PDCCH) downlink.

2. The method according to claim 1, wherein the preserved HARQ process is circularly used for the SPS transmission.

3. The method according to claim 2, further comprising:
at the base station side, sending an SPS Cell Radio Network Temporary Identifier (SPC-C-RNTI)-based PDCCH down, indicating a HARQ process for a first SPS transmission using the PDCCH or the RRC or other control instructions from the upper layer, and activating the first SPS transmission.

4. The method according to claim 1, wherein determining a type for transmission or retransmission to be carried in the current HARQ process based on a preset criteria at the base station side further comprises:
at the base station side, indicating whether the data transmission carried in the HARQ process currently preserved for the SPS transmission is an SPS transmission or a DS transmission using a standard-C-RNTI-based POOCH or an SPS-C-RNTI-based PDCCH, and determining a type for the data retransmission carried in the current HARQ process by combining data in a HARQ buffer corresponding to a HARQ process.

5. The method a cording to claim 4, wherein determining a type for transmission or retransmission to be carried in the current HARQ process based on a preset criteria at the base station side further comprises:
during the SPS transmission, in case that the base station is to perform the SPS transmission and there is DS data stored in the corresponding HARQ buffer, if the size of the HARQ buffer is taken into account:
for a HARQ buffer sufficiently storing two transfer blocks TBs, storing the SPS data together with the DS data in the HARQ buffer and sending the SPS data down without sending a PDCCH down simultaneously;
for a HARQ buffer only capable of storing one TB, replacing the original DS data with the SPS data and sending the SPS data down without sending a PDCCH down simultaneously.

6. The method according to claim 4, wherein determining a type for transmission or retransmission to be carried in the current HARQ process based on a preset criteria at the base station side further comprises:
during the SPS transmission, in case that the base station is to perform the SPS transmission and there is DS data stored in the corresponding HARQ buffer, if the size of the HARQ buffer is not taken into account, replacing the original DS data with the SPS data and sending the SPS data down without sending a PDCCH down simultaneously.

7. The method according to claim 4, wherein the determining a type for transmission or retransmission to be carried in the current HARQ process based on a preset criteria at the base station side further comprises:
during the SPS transmission, in case that the base station forcibly makes the SPS transmission not carried, performing another transmission using the HARQ process preserved for the SPS transmission, and sending a standard-C-RNTI-based PDCCH down.

8. The method according to claim 4, wherein determining a type for transmission or retransmission to be carried in the current HARQ process based on a preset criteria at the base station side further comprises:
during the DS transmission, performing the DS data transmission and sending a standard-C-RNTI-based PDCCH down when there is no SPS data stored in the HARQ buffer preserved for the SPS transmission.

9. The method according to claim 4, wherein determining a type for transmission or retransmission to be carried in the current HARQ process based on a preset criteria at the base station side further comprises:
during the DS transmission, performing the SPS data retransmission and sending an SPS-C-RNTI-based PDCCH or a standard-C-RNTI-based PDCCH down when there is SPS data stored in the HARQ buffer.

10. The method according to claim 1, further comprising:
at the UE side, receiving the RRC or other control instructions from the base station; receiving respective data transmission or retransmission and possible PDCCH from the base station; and
determining a type for the received data transmission or retransmission based on a preset criteria, so as to perform respective data combination.

11. The method according to claim 10, further comprising:
at the UE side, receiving a PDCCH from the base station to activate an SPS transmission, and determining a HARQ process for a first SPS transmission from the PDCCH, RRC or other control instructions.

12. The method according to claim 11, further comprising:
at the UE side, evaluating how to use the configured HARQ process for subsequent SPS transmission based on the received RRC or the other control instructions.

13. The method according to claim 10, wherein determining a type for the received data transmission or retransmission based on a preset criteria at the UE side further comprises:
during the SPS transmission, detecting a PDCCH based on the standard C-RNTI or the SPS C-RNTI, so as to get the type for the received data transmission or retransmission.

14. The method according to claim 10, wherein determining a type for the received data transmission or retransmission based on a preset criteria at the UE side further comprises:
during the SPS transmission, determining the current transmission is the SPS transmission if the UE does not detect any PDCCH.

15. The method according to claim 10, wherein determining a type for the received data transmission or retransmission based on a preset criteria at the UE side further comprises:
during the DS transmission, decoding the standard-C-RNTI-based PDCCH or the SPS-C-RNTI-based PDCCH, and determining a type for the received data transmission or retransmission by combining the data buffering status in respective HARQ buffer based on the decoding result.

16. The method according to claim 10, wherein,
at the UE side:
during the DS transmission,
if a PDCCH is detected based on the standard C-RNTI or the SPS C-RNTI and there is only one TB stored in respective HARQ buffer: it is determined that the received transmission is the DS retransmission when there is DS TB stored in respective HARQ buffer; and it is determined that the received transmission is the SPS retransmission when there is SPS TB stored in respective HARQ buffer;
if a PDCCH is detected based on the standard C-RNTI or the SPS C-RNTI and respective HARQ buffer is in idle, it is determined that the received transmission is the DS transmission;
if a PDCCH is detected based on the SPS C-RNTI and there are two TBs stored in respective HARQ buffer, it is determined that the received transmission is the SPS transmission; and
if a PDCCH is detected based on the standard C-RNTI and there are two TBs stored in respective HARQ buffer, it is determined that the received transmission is the DS retransmission.

17. The method according to claim 10, further comprising:
at the UE side: during the SPS transmission, performing corresponding data combination by combining the data buffering status in the HARQ buffer after determining the type for the received data transmission or retransmission, and sending the data to the upper layer when the data combination is performed correctly, otherwise continuing to store the data.

18. The method according to claim 1, wherein a HARQ process for the SPS transmission and other control information is reconfigured as required.

19. A system for allocating a Hybrid Automatic Repeat Request (HARQ) process for Downlink (DL) Semi-Persistant (SPS) transmission, comprising a base station side device, wherein the base station side device comprises:
a pre-configuration component that configures a HARQ process preserved for an SPS transmission and related control information for the SPS transmission based on Radio Resource Control (RRC) or other control instructions from the upper layer;
a HARQ process determination component that determines a HARQ process allocated to the current transmission based on configuration result of the pre-configuration component, and for allocating the HARQ process preserved for the SPS transmission to possible Dynamic Scheduling (DS) transmissions when the SPS transmission is in idle;
a transmission type determination component for determining a type for transmission or retransmission to be carried in the current HARQ process based on a preset criteria; and
a data transmission component that determines the type of transmission or retransmission, and correspondingly sends a Physical Downlink Control Channel (PDCCH) downlink.

20. The system according to claim 19, wherein the preserved HARQ process is used circularly for the SPS transmission.

21. The system according to claim 20, wherein the base station side device further comprises:
SPS transmission activation component that sends an SPS Cell Radio Network Temporary Identifier (SPC-C-RNTI)-based POOCH down to indicate a HARQ process for a first SPS transmission, and activates the first SPS transmission.

22. The system according to claim 19, wherein there is no need to send a POOCH down for each SPS transmission following the first SPS transmission.

23. The system according to claim 19, wherein the transmission type determination the base station side device further comprises:
a base station side HARQ buffer detection component that detects the data buffering status in a HARQ buffer corresponding to the current HARQ process: and
a base station side determination component that determines a type for the data transmission or retransmission to be carried in the current HARQ process based on the detection result of the base station side HARQ buffer detection component.

24. The system according to claim 19, further comprising a UE side device, wherein the UE side device comprises:
a data reception component that receives the RRC other control instructions from the base station and receives respective data transmission or retransmission and possible PDCCH from the base station;
a data type determination component that determines a type for the received data transmission or retransmission based on a preset criteria; and
a data combination component that performs respective data combination based on the result of the data type determination component.

25. The system according to claim 24, wherein the data type determination of the UE side device comprises:
a PDCCH detection component that decodes the standard-C-RNTI-based PDCCH or the SPS-C-RNTI-based PDCCH;
a UE side HARQ buffer detection component that detects the data buffering status in the corresponding HARQ buffer; and
a UE side determination component that determines a type for the received data transmission or retransmission by combining detecting results of the PDCCH detection component and the UE side HARQ buffer detection component.

* * * * *